Oct. 31, 1961     G. C. HAETTINGER ET AL     3,006,157

CRYOGENIC APPARATUS

Filed May 4, 1960

INVENTORS
GEORGE C. HAETTINGER
RICHARD M. POORMAN

BY

ATTORNEY

United States Patent Office 3,006,157
Patented Oct. 31, 1961

3,006,157
CRYOGENIC APPARATUS
George C. Haettinger and Richard M. Poorman, Indianapolis, Ind., assignors to Union Carbide Corporation, a corporation of New York
Filed May 4, 1960, Ser. No. 26,814
9 Claims. (Cl. 62—259)

The instant invention relates to an improved refrigerated mounting device for small components. More particularly, it relates to such a device which utilizes a cryogenic liquid as the cooling agent and which is effectively operable in various attitudes.

Recent developments in cryogenic technology has revealed that a number of materials exhibit very unusual properties at extremely low temperatures such as those of liquid nitrogen. While this research has only scratched the surface of possibilities in the field, a number of devices have been developed which have marked utility at these temperatures for detecting radiation in the electromagnetic wave spectrum, especially in the infra-red portion of the spectrum. Among these devices are masers and infra-red detection cells.

Infra-red sensing apparatus, for example, is quite useful for detecting the location of objects by the infra-red or heat waves radiating from the object. The homing mechanism on certain air-to-air missiles, for example, is operated by means of such a sensing apparatus. It has been found that the infra-red detection cell is most effective when maintained at an extremely low temperature, such as the temperature of liquid nitrogen. Therefore, a considerable effort has been expended by the industry to produce apparatus for effectively cooling infra-red and other similar sensing elements to about liquid nitrogen temperature and which also does not use prohibitive amounts of the liquid refrigerant. Some of the sensing elements are mounted on a "hunting" device which moves up, down and sideways in order to cover the greatest possible "searching area." Most presently available cooling devices are not suitable for use in such a "hunting" device since they rely on gravity feed of the liquid, thus becoming ineffective when the device is positioned upward causing the liquid refrigerant to drain away from the intended cooling area.

This same movement of the device also causes "sloshing" of the liquefied gas which, in the present case, would be undesirable because some of the liquid refrigerant would be lost through the vent line. This is undesirable because any loss of refrigerant represents a loss of holding time for the cooling device.

It is accordingly the primary object of the present invention to provide a refrigerated mounting means for small devices having optimum cooling efficiency.

It is a further object to provide such an apparatus which is capable of operating in various attitudes without loss of liquid refrigerant.

Other objects and advantages of the invention will be apparent from the accompanying specification and drawings in which.

The objects of the invention are accomplished in general by a refrigerated mounting means for small components which comprises a container having means therein for supporting the small component. A liquid refrigerant receptacle is located in the central portion of the container surrounded by insulation material, and is in heat exchange relation with the small component. A liquid refrigerant inlet line passes through the wall of the container through the insulation material and enters the receptacle. A vent line similarly connected to the receptacle is likewise provided. Flow restricting means are also provided with the receptacle interposed between the inlet line and vent for separating the liquid and gas phases of the refrigerant and also for preventing direct flow of liquid between the inlet and vent.

By means of the present invention the refrigerated mounting is effective in various attitudes and is insulated so as to substantially maintain the liquid refrigerant temperature. In addition, the liquid refrigerant is completely vaporized within the receptacle so that there is no loss of liquid through the vent line. Flow of liquid under pressure into the fill line is preferably controlled by a sensing element positioned in the outlet line at the receptacle exit.

Figure 1:
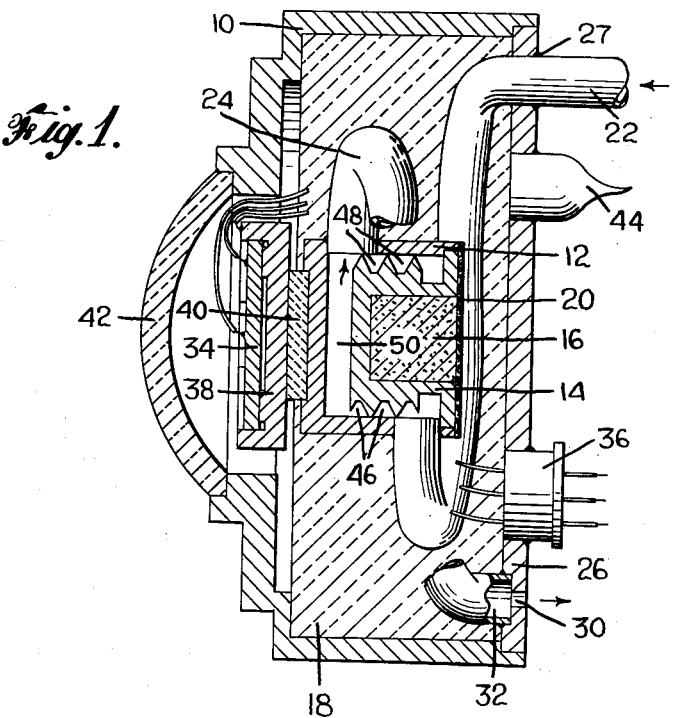
FIG. 1 is a view of a cross-section axially thru a preferred embodiment of the invention (with some parts shown in elevation)

The invention will now be described in more detail with respect to the accompanying drawings wherein like reference numerals are used to indicate like parts. Referring particularly to FIG. 1, the refrigerated mounting means comprises a container or case 10, a liquid refrigerant receptacle 12 having a metal insert 14 and an adsorbent material 16 communicating with an opacified insulation 18 through glass cloth 20. Inlet and outlet refrigerant lines 22 and 24 pass through back plate 26, through the opacified insulation 18 to the liquid refrigerant receptacle 12. The length of inlet line 22 before it enters the case 10 is limited by the requirement that there should be no substantial vaporization of the liquid within the line. Vent line 24 has an orifice 30 which regulates the pressure drop and hence the flow rate at the case outlet 32 thereby acting as a controller for the flow of liquid into inlet line 22. Infra-red detection cell 34 having an electrical connection 36 is in thermal contact with the liquid refrigerant receptacle 12 through the sub-support 38 and a sapphire support means 40. The reason for the use of the sapphire support means will be further discussed later. The lens 42, which forms an integral part of case 10, directs the radiation waves to the infra-red detection cell 34. The insulation is evacuated through tube 44 which is then "pinched-off" and sealed. The sub-support 38 is fabricated from Kovar, a steel alloy, for use with the detection cell 34.

In operation the liquid refrigerant is fed into the refrigerant receptacle 12 through the inlet line 22. The liquid is then directed through the helical paths 46 formed by the threaded portions 48 of the metal insert 14. Flow of the liquid refrigerant through these helical passageways forces the liquid to come in greater contact with the brass material of the refrigerant receptacle 12 and the metal insert 14 which, because of the good thermal conductivity of the brass, will more effectively maintain the desired low temperature to the detection cell 34 through the sapphire support means 40. During filling and subsequent storage of the refrigerant, vapors from the low-boiling point liquid are vented through the vent line 24 from the chamber 50. Normally, only vapors pass into the vent line. Under sloshing conditions, however, with a single chamber, liquid might flow into the vent line. This is prevented, however, by directing the liquid through the helical passageways 46, thereby allowing only vapor in the chamber 50 which is subsequently directed out the vent line 24. The combination of the helical passageways 46 and the helically formed inlet line 22 creates a resistance to flow of the liquid and thereby prevents the liquid from rapidly draining from the refrigerant receptacle 12. The helical form also tends to trap liquid when in various orientations.

The term "vacuum" as used herein is intended to apply to sub-atmospheric pressure conditions of not greater than 50 microns of mercury and preferably below 1 micron of mercury. The term "opacified insulation" as used herein refers to a two-component insulating system comprising a low heat conductive, radiation-permeable material and a radiant heat impervious material which is capable of reducing the passage of infra-red radiation rays without significantly increasing the thermal conductivity of the insulating system.

An adsorbent or molecular sieve 16, either in powder or pellet form, is preferably used with the insulation to remove by adsorption any gas which may leak into the insulation space. This is important since no provision is made in this device for re-evacuation of the insulated space. In particular, zeolitic molecular sieves having pores of at least 5 angstrom units in size, as disclosed in U.S. 2,900,800, are preferred as the adsorbent since they have extremely high adsorptive capacity at the temperature and pressure conditions existing in the insulation and are chemically inert toward any gases which might leak into the insulation.

While several different materials having relatively high thermal conductivity and low electrical conductivity at room temperature might be suggested to mount and provide electrical insulation between the liquid refrigerant receptacle and the infra-red detection cell 34, the sapphire support means 40 is the most useful material due to its unique properties. It has a relatively high thermal conductivity at liquid nitrogen temperature ($-196°$ C.) of about 2 cal./sec. deg. cm. It also has a relatively high bending modulus which resists deformation during operation, for example, in an airborne missile caused by forces created through changes in orientation or direction of the support means. In the present case, this is a desirable property because of the importance of dimensional stability.

The container 10, liquid refrigerant receptacle 12, and the metal insert 14 are made from free-cutting brass which has relatively good thermal conductivity at low temperatures and at the same time exhibits sufficient ductility which at low temperatures is desirable to prevent brittleness. Other materials exhibiting like properties may be used if so desired.

Figure 2:
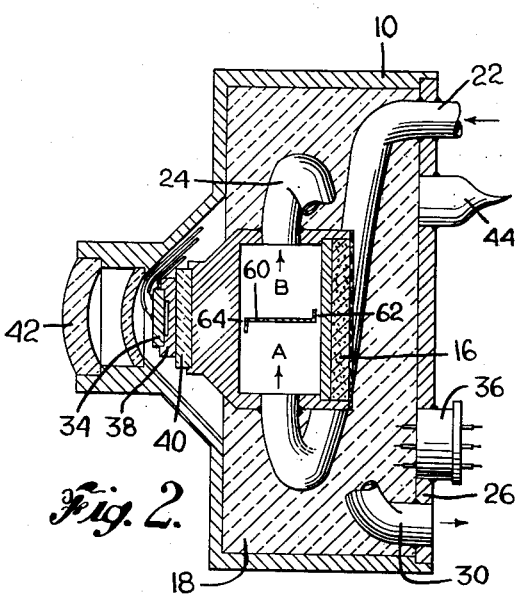
FIG. 2 is a view of a cross-section axially thru another embodiment of the invention (with some parts shown in elevation)

Another form of the invention is depicted in FIG. 2 in which the threaded metal insert 14 illustrated in FIG. 1 is replaced by a baffle or partition 60. The liquid refrigerant remains in chamber A and the vapor flows through passages 62 and 64 to chamber B and thence out the vent line 24. The threaded metal insert 14 is, however, the preferable construction. In this embodiment, the baffle 60 functions in the same manner as the insert 14 of FIG. 1 i.e. it improves heat exchange between the receptacle 12 and the refrigerant and functions together with passages 62 and 64 as a flow restriction for liquid refrigerant which might otherwise be lost through vent line 24.

Figure 3:
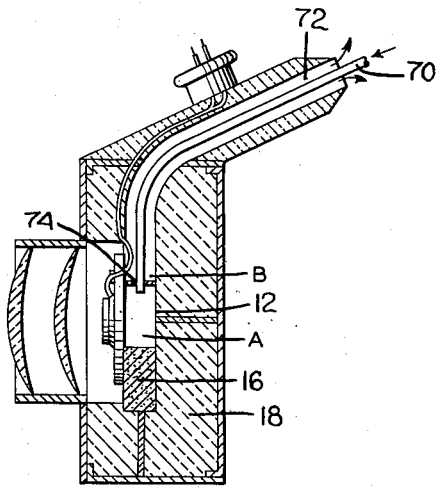
FIG. 3 is a cross-section axially thru still another embodiment of the invention (with some parts shown in elevation).

Still another form of the invention is depicted in FIG. 3. In this arrangement, the inlet line 70 is located within the vent line 72 with the vent being surrounded by opacified insulation 18. The particular filling and vent means of this invention has the unique advantage of allowing the use of a long combination fill and vent tube without extending the overall dimensions of the container. The insulated filling tube provides a high resistance to heat flow from the outer vessel to the liquid refrigerant receptacle 12. Instead of the threaded metal insert or the baffle arrangement depicted in FIGS. 1 and 2, the baffle in this case is the partition 74 of the receptacle that receives the inlet and venting lines 70 and 72. This partition having suitable perforations functions in the same manner as baffle 60 in the embodiment of FIG. 2 forming similar chambers A and B containing liquid and gaseous refrigerant respectively. In the construction depicted in FIG. 1, the inlet line 22 enters the case through the backup plate 26 which is exposed to atmospheric or ambient conditions. Consequently, there will be heat leak by conduction through contact 27 tending to vaporize the liquid in the inlet line 22. This would not be a problem in the construction depicted in FIG. 3 because there would be no such contact since the inlet line 70 is centrally located within the vent line 72 which is surrounded by opacified insulation 18.

By means of the present invention excellent results have been obtained in maintaining liquid nitrogen temperatures in infra-red detection cells with very little loss of liquid refrigerant as the attitude of the assembly is changed. While the invention has been particularly described with reference to an infra-red detection cell it is obvious that the mounting means could equally well be used with other small components such as masers and the like.

The invention has been shown and described with reference to certain specific embodiments, however, it is to be understood that modifications and substitutions can be made by a person skilled in the art without departing from the spirit and scope thereof.

What is claimed is:

1. A refrigerated mounting means for small components which comprises a container, a refrigerant receptacle located within and substantially at the center of said container, insulating means surrounding said receptacle, a small component mounted within said container and in heat exchange relationship with said receptacle, refrigerant inlet and vent conduits passing through the walls of said container through the insulating means and connected to said receptacle at displaced points, and flow restriction means located within said receptacle forming a non-linear flow path between said inlet and vent conduits such that the refrigerant is maintained in direct thermal contact with said receptacle along the flow path.

2. A refrigerated mounting means for small components as set forth in claim 1 wherein the flow restriction means comprises a spiral path located adjacent the inner surface of said receptacle.

3. A refrigerated mounting means for small components as set forth in claim 1 wherein the flow restriction means comprises a partition member extending across the receptacle between the inlet and vent means, said partition defining a plurality of small apertures between its edges and the receptacle walls.

4. A refrigerated mounting means for small components as set forth in claim 1 wherein the vent and inlet conduits are concentric tubes, the outer vent tube terminating at the receptacle wall, the inner inlet tube extending into the receptacle and passing through a transverse partition therein terminating adjacent the opposite wall of said receptacle, and wherein the partition has at least one aperture therein.

5. A refrigerant mounting means according to claim 4 wherein said concentric fill and vent tubes are surrounded by an opacified insulation.

6. A mounting means as set forth in claim 1 wherein the inlet and vent conduits enter the receptacle at opposite sides thereof and wherein each conduit makes at least one half of a turn around the receptacle between the point where it passes through the container wall and where it enters the receptacle.

7. A mounting means as set forth in claim 1 wherein the insulating means comprises an opacified insulating medium and wherein the space between the receptacle and container additionally contains a gas adsorbent material.

8. A mounting means as set forth in claim 1 wherein a portion of the container wall in optical alignment with the small component mounted therein is transparent to electro-magnetic radiation.

9. A refrigerated mounting means for small components which comprises a container, a cylindrical refrigerant receptacle mounted within and substantially at the center of said container, opacified insulation means substantially surrounding said receptacle, a cylindrical member inserted within said receptacle in surface to surface contact therewith terminating short of one end of said receptacle forming a refrigerant reservoir therein, a vent conduit passing through the wall of said container making at least a 180° turn around said receptacle and entering said receptacle at the refrigerant reservoir, an inlet conduit passing through the wall of said container also making a 180° turn around said receptacle and entering same at the opposite end from the refrigerant reservoir, a spiral groove formed in the surface of said insert which forms a flow path for refrigerant in the receptacle between the inlet conduit and the refrigerant reservoir, a small component mounted in direct heat exchange relationship with said receptacle and in optical alignment with a window transparent to electromagnetic radiation in the wall of said container.

References Cited in the file of this patent

UNITED STATES PATENTS

| | | |
|---|---|---|
| 2,671,154 | Burstein | Mar. 2, 1954 |
| 2,711,084 | Bergan | June 21, 1955 |